(12) United States Patent
Herntrich et al.

(10) Patent No.: US 9,802,529 B2
(45) Date of Patent: Oct. 31, 2017

(54) METHOD FOR CONTROLLING A CORNERING LIGHT AND LIGHTING DEVICE

(71) Applicant: HELLA KGaA Hueck & Co., Lippstadt (DE)

(72) Inventors: Matthias Herntrich, Berlin (DE); Ingo Hoffmann, Berlin (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 70 days.

(21) Appl. No.: 14/717,065

(22) Filed: May 20, 2015

(65) Prior Publication Data
US 2015/0336500 A1   Nov. 26, 2015

(30) Foreign Application Priority Data
May 22, 2014   (DE) .......................... 10 2014 209 771

(51) Int. Cl.
*B60Q 1/08*   (2006.01)
*B60Q 1/12*   (2006.01)
*B60Q 1/16*   (2006.01)

(52) U.S. Cl.
CPC ............... *B60Q 1/085* (2013.01); *B60Q 1/12* (2013.01); *B60Q 1/08* (2013.01); *B60Q 1/16* (2013.01); *B60Q 2300/322* (2013.01)

(58) Field of Classification Search
CPC .......... B60Q 1/076; B60Q 1/08; B60Q 1/085; B60Q 1/143; B60Q 1/16; B60Q 1/02; B60Q 1/04; B60Q 1/0425; B60Q 2300/32; B60Q 2300/322; B60Q 2300/324; B60Q 1/05; B60Q 1/06
See application file for complete search history.

(56) References Cited

U.S. PATENT DOCUMENTS

| 5,660,454 | A  | * | 8/1997  | Mori ...................... | B60Q 1/085 362/466 |
| 2001/0026454 | A1 | * | 10/2001 | Komatsu ............. | F21S 48/1358 362/487 |

(Continued)

FOREIGN PATENT DOCUMENTS

| DE | 197 13 884 A1 | 10/1998 |
| DE | 101 12 996 A1 | 9/2002 |

(Continued)

OTHER PUBLICATIONS

German Search Report, Application No. DE 10 2014 209 771.1, Jan. 19, 2015, 7 pgs.

*Primary Examiner* — Thomas G Black
*Assistant Examiner* — Sara Lewandroski
(74) *Attorney, Agent, or Firm* — Paul D. Strain, Esq.; Strain & Strain PLLC

(57) ABSTRACT

The invention relates to a method for controlling a predictive cornering light with at least one headlight with a pivoting means for the controlled pivoting of the headlight, wherein a monitoring device is provided, which monitors the roadway and/or lane in front of the vehicle, and a control unit is provided, which, on the basis of the data of the monitoring device, drives the pivoting means for setting the headlight for illuminating the roadway and/or lane. The invention also relates to a lighting device in this regard.

27 Claims, 5 Drawing Sheets

(56) References Cited

U.S. PATENT DOCUMENTS

| | | | |
|---|---|---|---|
| 2002/0036901 A1* | 3/2002 | Horii | B60Q 1/12 362/37 |
| 2002/0080617 A1* | 6/2002 | Niwa | B60Q 1/085 362/465 |
| 2004/0114379 A1* | 6/2004 | Miller | B60Q 1/085 362/464 |
| 2006/0028832 A1* | 2/2006 | Horii | B60Q 1/12 362/514 |
| 2007/0198156 A1* | 8/2007 | Yamada | B60Q 1/085 701/49 |
| 2008/0101076 A1* | 5/2008 | Sugimoto | B60Q 1/12 362/466 |
| 2008/0106886 A1* | 5/2008 | Sugimoto | B60Q 1/122 362/37 |
| 2008/0239698 A1* | 10/2008 | Ibrahim | B60Q 1/12 362/37 |
| 2010/0134011 A1* | 6/2010 | Kobayashi | B60Q 1/085 315/82 |
| 2011/0025209 A1* | 2/2011 | Nakanishi | B60Q 1/12 315/82 |
| 2012/0123648 A1* | 5/2012 | Moizard | B60Q 1/12 701/49 |
| 2012/0229028 A1* | 9/2012 | Ackermann | B60Q 1/085 315/82 |
| 2012/0271511 A1* | 10/2012 | Dierks | B60Q 1/143 701/36 |
| 2012/0286662 A1* | 11/2012 | Jeong | B60Q 1/085 315/82 |
| 2013/0027511 A1* | 1/2013 | Takemura | G06K 9/00805 348/42 |
| 2013/0051041 A1* | 2/2013 | Mohamed | B60Q 1/12 362/466 |
| 2013/0051042 A1* | 2/2013 | Nordbruch | B60Q 1/085 362/466 |
| 2013/0148368 A1* | 6/2013 | Foltin | B60Q 1/08 362/466 |
| 2013/0242100 A1* | 9/2013 | Seki | B60Q 1/04 348/148 |
| 2013/0317703 A1* | 11/2013 | Kubitza | B60Q 1/076 701/49 |
| 2015/0042224 A1* | 2/2015 | Stout | B60Q 1/10 315/82 |
| 2015/0251586 A1* | 9/2015 | Imaeda | B60Q 1/12 362/466 |
| 2016/0023591 A1* | 1/2016 | Imaeda | B60Q 1/1423 315/82 |

FOREIGN PATENT DOCUMENTS

| | | |
|---|---|---|
| DE | 10 2005 022 677 A1 | 11/2006 |
| DE | 10 2007 007 321 A1 | 8/2007 |
| DE | 10 2008 000 091 A1 | 8/2008 |
| DE | 10 2008 061 747 A1 | 6/2009 |
| DE | 10 2012 002 058 A1 | 1/2013 |

* cited by examiner

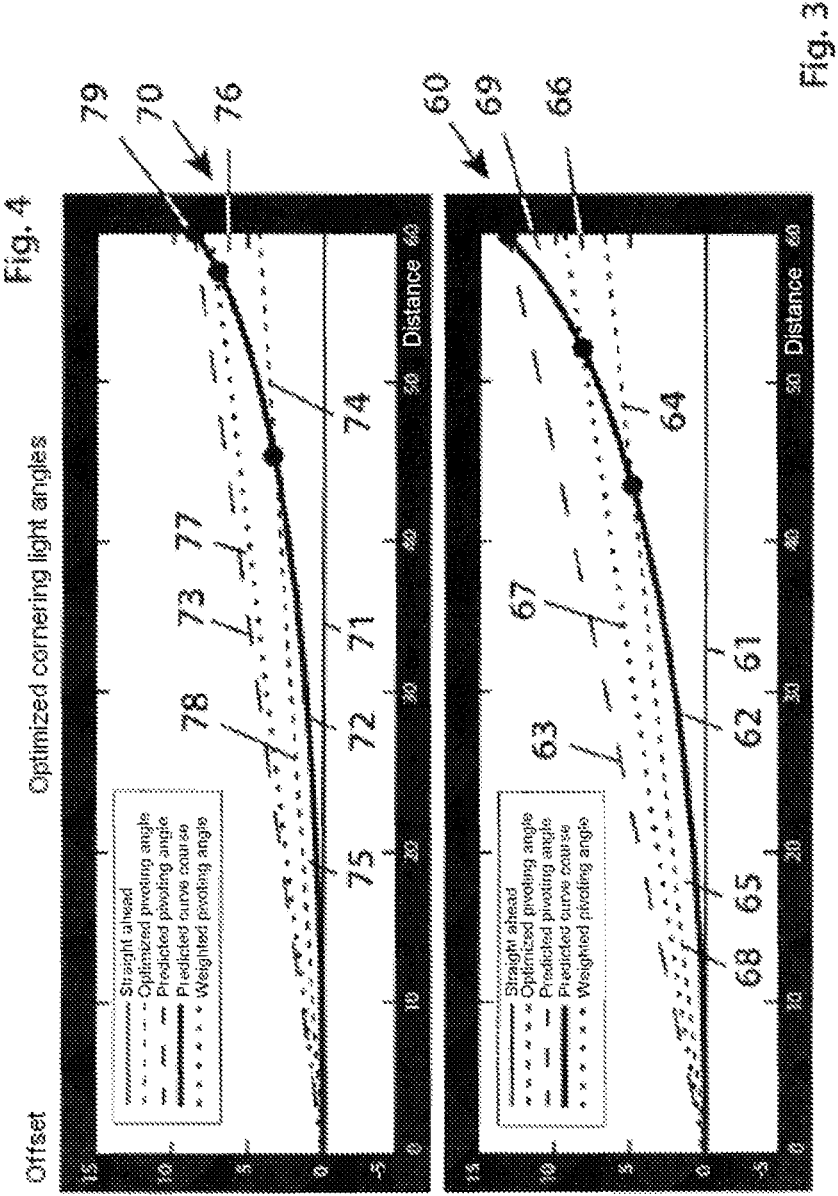

METHOD FOR CONTROLLING A CORNERING LIGHT AND LIGHTING DEVICE

CROSS-REFERENCE TO RELATED PATENT APPLICATIONS

This application is based upon and claims the benefit of priority from prior German Patent Application No. 10 2014 209 771.1, filed May 22, 2014, the entire contents of which are incorporated herein by reference in their entirety.

TECHNICAL FIELD

The invention relates to a method for controlling a cornering light of a motor vehicle, such as, in particular, a predictively controlled cornering light, according to the preamble of claim 1, and a lighting device in this regard according to the preamble of claim 12.

PRIOR ART

In the prior art, a cornering light has been disclosed for vehicles, in the case of which cornering light the pivoting of the headlights is controlled on the basis of turning the steering wheel, in order to illuminate a roadway region in a curve. This has the effect that the roadway in front of the vehicle is illuminated by non-pivoted headlights until the driver actually steers the vehicle into the curve. In this case, optimum illumination of the roadway in the curve region is not achieved, however, because the curve is still unilluminated or only slightly illuminated until turn-in.

Turning lights have also been disclosed in the case of which a separate turning headlight is switched on or off prior to turning. In this case, the turning light is also controlled in a manner dependent on the position of the steering wheel.

In order to further improve the cornering light, predictively controlled corner lights have been disclosed. In the case of a predictively controlled cornering light of a motor vehicle, a monitoring device monitors the roadway in front of the vehicle and ascertains the roadway course and/or the lane course on the basis of the measured roadway data. The pivoting angle of the headlights is set on the basis of the roadway course and/or lane course in order that the light emitted onto the roadway by the respective headlight is tracked to the roadway course and/or the lane course in order to achieve an improved illumination of the roadway and/or the lane.

It has been found here, however, that in the case of narrow curves with a small curve radius the light is guided beyond the edge of the roadway in order to follow the curve, which has the effect that the roadway in particular directly in front of the motor vehicle is only illuminated slightly, which is regarded as rather inconvenient.

DE 10 2008 000 091 A1 relates to a method for controlling a pivoting angle on the basis of road information data made available by a navigation system. This has the disadvantage, however, that said road information data are not available in the case of vehicles not having a navigation system. Even in the case of vehicles having a navigation system, however, driving situations occur in which no signal link exists between the vehicle and the navigation satellites, with the result that the functionality is then no longer present. Moreover, the obsolescence of map data is a problem for the functionality of determining the pivoting angle.

DE 101 12 996 A1 describes a predictive corner light in which, during cornering, after reaching the smallest curve radius, the pivoting angle is decreased more rapidly than actually corresponds to the further course of the curve. This still has the disadvantage that the road may be inadequately illuminated during the process of driving into the curve because the pivoting in this driving situation still follows the course of the curve.

SUMMARY OF THE INVENTION, PROBLEM, SOLUTION, ADVANTAGES

The problem addressed by the invention is that of providing a method and a lighting device by means of which an improved illumination of the roadway and/or of the lane in front of the motor vehicle can be achieved.

The problem with regard to the method is solved by means of the features of claim 1.

One exemplary embodiment of the invention relates to a method for controlling a predictive cornering light with at least one headlight with a pivoting means for the controlled pivoting of the headlight, wherein a monitoring device is provided, which monitors the roadway and/or lane in front of the vehicle and generates roadway data, wherein a control unit is provided, which, on the basis of the data of the monitoring device, drives the pivoting means for setting the headlight for illuminating the roadway and/or lane, wherein for maximizing the illumination of the roadway and/or lane, a model of the headlight light distribution is used in addition to the roadway data, wherein the deviation between the model of the headlight light distribution and the roadway on the basis of the roadway data is minimized by a rotation of the model of the headlight light distribution in particular relative to the roadway and a pivoting angle is determined on the basis of the resultant position of the model of the headlight light distribution, said pivoting angle being used for driving the headlight. In this regard, the illumination is maximized because an adjustment can be performed in a simple manner on the basis of the headlight light distribution by means of the model in this regard together with the ascertained roadway data. The adjustment between the model of the headlight light distribution and the roadway can be performed on the basis of the roadway data. A representation of the roadway on the basis of the roadway data is generated for this purpose.

A rotation of the model of the headlight light distribution results in a change in the position of the model of the headlight light distribution with respect to the roadway representation on the basis of the roadway data. As a result of the position change with respect to one another, the deviation between the model of the headlight light distribution and the representation of the roadway also changes. The position of the model of the headlight light distribution is chosen such that the deviation is minimal.

It is particularly advantageous if the pivoting angle corresponds to a resulting rotation angle of the model of the headlight light distribution relative to a selected and/or initial model position. In this regard, an initial model position is for example a model position in which the headlight is settable at the beginning of travel, without said headlight already having been pivoted.

According to the invention, it is also advantageous if the selected and/or initial model position is defined as a position of the model of the headlight light distribution without pivoting. The initial model position is thus definable in a simple manner.

Moreover, it is expedient if the minimization of the deviations corresponds to a minimization of the sum of all partial deviations of the roadway from the model. In this regard, the problem of the determination can be divided into partial problems. Additionally, different partial deviations can be determined in a simple manner, which can then be combined to form a total deviation.

Moreover, it is advantageous if the minimization of the deviations corresponds to a minimization of the difference of a right-hand at least one partial deviation and/or of a left-hand at least one partial deviation between roadway and model. In this regard, the deviation can be determined in a simple manner by virtue of the fact that a right and a left deviation are ascertainable, which are taken into account jointly.

According to the invention it is advantageous if the model is a section model. In this case, it is advantageous if the section model describes the centroid position of the light distribution. Alternatively, it is advantageous if the section model is a section of the length of the low-beam light range. In this regard, the section can be defined in a simple manner.

It is advantageous according to the invention if the determination of the at least one partial deviation between the roadway and the section model is effected by means of at least one area determination between the section and a curve characterizing the roadway course or lane course. In this regard, the deviation can also be determined in a simple mathematical manner.

Moreover, it is advantageous if a first area arises as an area between the section and the curve characterizing the roadway course or lane course up to the point of intersection thereof and a second area arises between the section and the curve characterizing the roadway course or lane course after the point of intersection thereof up to a predefinable distance, wherein in the case of a right-hand curve the first area is defined as the right-hand partial deviation and the second area is defined as the left-hand partial deviation, and in the case of a left-hand curve the first area is defined as the left-hand partial deviation and the second area is defined as the right-hand partial deviation.

Moreover, it is expedient if the section lies in the selected and/or initial model position on a straight line in the direction of the vehicle longitudinal axis and proceeds from the current position of the vehicle.

Furthermore, in accordance with a further concept according to the invention it is advantageous if the model is an area model. In this case, it is advantageous if the area model is an area which is situated on the roadway plane and which is delimited by at least one curve.

Moreover, it is advantageous if the area model is the area between a right-hand delimiting ray and between a left-hand delimiting ray up to a predefinable distance. As a result, the area can be defined in a simple manner.

Furthermore, in a further exemplary embodiment, it is advantageous if the model is a volume model.

In this case, it is advantageous if the determination of the at least one partial deviation between the roadway and the volume model is carried out by means of an intersection area determination between the roadway plane and the volume and by means of a determination of the at least one area proportion which lies on the left and/or on the right alongside the lane on said intersection area.

One exemplary embodiment of the invention additionally relates to a method for controlling a predictive cornering light with at least one headlight with a pivoting means for the controlled pivoting of the headlight, wherein a monitoring device is provided, which monitors the roadway and/or lane in front of the vehicle and generates roadway data, wherein a control unit is provided, which, on the basis of the data of the monitoring device, drives the pivoting means for setting the headlight for illuminating the roadway and/or lane, wherein for maximizing the illumination of the roadway and/or lane, a model of the headlight light distribution is used in addition to the roadway data, wherein the deviation between the model of the headlight light distribution and the roadway on the basis of the roadway data is minimized by a rotation of the model of the headlight light distribution and a first pivoting angle is determined on the basis of the resultant position of the model of the headlight light distribution, wherein a second pivoting angle is determined from the first pivoting angle depending on the curve radius of the roadway, said second pivoting angle being used for driving the headlight.

The problem with regard to the lighting device is solved by means of the features of claim 17.

One exemplary embodiment of the invention relates to a lighting device comprising at least one headlight with a pivoting means for the controlled pivoting of the headlight for controlling a predictive cornering light, wherein a monitoring device is provided, which monitors the roadway and/or lane in front of the vehicle and generates roadway data, and wherein a control unit is provided, which, on the basis of the data of the monitoring device, drives the pivoting means for setting the headlight for illuminating the roadway and/or lane, in particular for carrying out a method according to the invention.

The problem with regard to the method is also solved by means of the features of claim 18.

One exemplary embodiment of the invention relates to a method for controlling a predictive cornering light with at least one headlight with a pivoting means for the controlled pivoting of the headlight, wherein a monitoring device is provided, which monitors the roadway and/or lane in front of the vehicle and generates roadway data, wherein a control unit is provided, which, on the basis of the data of the monitoring device, drives the pivoting means for setting the headlight for illuminating the roadway and/or lane, characterized in that a first pivoting angle is determined from the roadway data at a roadway point at a predetermined distance in front of the vehicle, wherein a second pivoting angle is determined from the first pivoting angle, depending on the curve radius of the roadway, said second pivoting angle being used for driving the headlight.

It is particularly advantageous if the second pivoting angle is corrected, such as in particular reduced, relative to the first pivoting angle by means of a correction. In this regard, a correctable pivoting angle is used to illuminate the roadway, which is advantageous in certain roadway situations.

In this case, it is particularly advantageous if the correction is greater in the case of a smaller curve radius than in the case of a larger curve radius. In this regard, an advantageous adaptation to the road conditions can be effected.

In this case, it is advantageous if the first pivoting angle is determined according to a predefined method.

In particular, it is also advantageous in this case if, for calculating the first pivoting angle, a model of the headlight light distribution is used in addition to the roadway data of the monitoring device that monitors the roadway and/or lane in front of the vehicle, wherein the deviation between the model of the headlight light distribution and the roadway on the basis of the roadway data is minimized by a rotation of the model of the headlight light distribution and a pivoting angle is determined on the basis of the resultant position of the model of the headlight light distribution.

It is also particularly advantageous if the first pivoting angle is determinable by ascertaining, on the basis of the ascertained roadway course or lane course, the point of intersection between the roadway course or lane course and a straight line at the predetermined distance, wherein the straight lane proceeds from the current position of the motor vehicle.

Moreover, it is expedient if the second pivoting angle is determined in such a way that a straight line is determined, whose point of intersection with the ascertained roadway course or lane course is chosen in such a way that the resulting two areas between the straight line and the roadway course or lane course up to the predetermined distance assume a predefinable size ratio. In this regard, the pivoting angle can be adapted to the course of the road in a simple manner.

In this case, in one exemplary embodiment, it is advantageous if the areas are of identical size.

It is particularly advantageous if the size ratio is dependent on the curve radius.

In this case, it is particularly expedient if a first area arranged nearer to the vehicle and a second area further away from the vehicle are formed, wherein the ratio between the sizes of the two areas is chosen depending on the curve radius.

Moreover, it is particularly expedient if in the case of a first predefinable curve radius, such as, in particular, an infinite curve radius, the first area is maximal and the second area is zero.

Alternatively, it is advantageous if in the case of a second predefined curve radius the size of the first area is equal to the size of the second area.

Furthermore, it is expedient if in the case of a curve radius between the second predefined curve radius and a first predefinable curve radius the ratio of the size of the first area to the size of the second area rises.

The problem with regard to the method is also solved using embodiments of the present application.

One exemplary embodiment of the invention relates to a method for controlling a predictive cornering light with at least one headlight with a pivoting means for the controlled pivoting of the headlight, wherein a monitoring device is provided, which monitors the roadway and/or lane in front of the vehicle and generates roadway data, wherein a control unit is provided, which, on the basis of the data of the monitoring device, drives the pivoting means for setting the headlight for illuminating the roadway and/or lane, wherein an area determination is performed from the profile of the roadway data and by means of an auxiliary line proceeding from the vehicle, on the basis of which the point of intersection between the course of the roadway and the auxiliary line is determined, which characterizes the pivoting angle of the headlight that is used for driving the headlight.

In this case, it is advantageous if the pivoting angle is defined as an angle between the auxiliary line and the vehicle longitudinal direction.

Moreover, it is advantageous if the area determination is effected in such a way that a predefinable ratio is achieved between the first area between the auxiliary line and the roadway course up to the point of intersection thereof and the second area between the auxiliary line and the roadway course after the point of intersection up to a predefinable distance.

It is particularly advantageous if the area determination is effected in such a way that the ratio between the first area and the second area assumes a predefinable value.

According to the invention it is advantageous if the area determination is effected in such a way that the ratio between the first area and the second area is 1:1.

The problem with regard to the lighting device is solved using embodiments of the present application.

One exemplary embodiment of the invention relates to a lighting device comprising at least one headlight with a pivoting means for the controlled pivoting of the headlight for controlling a predictive cornering light, wherein a monitoring device is provided, which monitors the roadway and/or lane in front of the vehicle and generates roadway data, wherein a control unit is provided, which, on the basis of the data of the monitoring device, drives the pivoting means for setting the headlight for illuminating the roadway and/or lane, in particular for carrying out a method according to the invention.

One exemplary embodiment of the invention also relates to a method for controlling a predictive cornering light with at least one headlight with a pivoting means for the controlled pivoting of the headlight, wherein a monitoring device is provided, which monitors the roadway and/or lane in front of the vehicle and generates roadway data, wherein a control unit is provided, which, on the basis of the data of the monitoring device, drives the pivoting means for setting the headlight for illuminating the roadway and/or lane, wherein a first pivoting angle is determined from the roadway data at a roadway point at a predetermined distance in front of the vehicle, wherein a second corrected pivoting angle is determined from the first pivoting angle depending on the curve radius, said second pivoting angle being used for driving the headlight. What is thereby achieved is that the roadway or the lane in front of the vehicle is better illuminated even during cornering.

In this case, it is advantageous in particular if the second pivoting angle is reduced relative to the first pivoting angle by means of the correction. In this regard, during cornering, the light is better concentrated onto a region in front of the vehicle.

It is particularly advantageous if the correction turns out to be greater in the case of a smaller curve radius than in the case of a larger curve radius. This means that in the case of a smaller curve radius, that is to say in the case of a narrower curve, the light is concentrated onto the region lying directly in front of the vehicle more intensely than in the case of a larger curve radius.

It is particularly advantageous if the first pivoting angle is determinable by ascertaining, on the basis of the ascertained roadway course or lane course, the point of intersection between the roadway course or lane course and a straight line at the predetermined distance, wherein the straight lane proceeds from the current position of the motor vehicle. This brings about a geometrical ascertainment between a line corresponding to the course of the curve and a straight line which proceeds from the vehicle and intersects the curve at a predetermined distance. A first pivoting angle can be reliably determined therefrom and the determination is independent of other reference data which might not always be available according to the circumstances.

Moreover, it is expedient if the second pivoting angle is determined in such a way that a straight line is determined, whose point of intersection with the ascertained roadway course or lane course is chosen in such a way that the resulting two areas between the straight line and the roadway course or lane course up to the predetermined distance assume a predefinable size ratio. In this regard, from the geometrical determination of the first pivoting angle on a corresponding basis a geometrical determination of the second pivoting angle is derived, which can be carried out in a simple manner.

In one preferred exemplary embodiment, the areas are of identical size. A first limit value for a first pivoting angle which has been found to be advantageous for small curve radii is determined as a result.

In a further exemplary embodiment, however, it is also advantageous if the size ratio is dependent on the curve radius. As a result, a modulation of the pivoting angle depending on the actual curve radius is carried out, which is advantageous in the case of small curve radii.

In this case, it is particularly advantageous if an area arranged nearer to the vehicle and an area further away from the vehicle are formed, wherein the ratio between the sizes of the two areas is chosen depending on the curve radius.

Moreover, it is expedient if, in the case of a first predefined curve radius, such as, in particular, an infinite curve radius, the first area is maximal and the second area is zero. A first limiting case is thus definable.

Furthermore, it is expedient if, in the case of a second predefined curve radius, the size of the first area is equal to the size of the second area. A second limiting case is definable as a result. Here, the second curve radius is smaller than the first curve radius.

This is advantageous if in the case of a curve radius between the second predefined curve radius and the first predefinable curve radius the ratio of the size of the first area to the size of the second area rises.

BRIEF DESCRIPTION OF THE DRAWINGS

The invention is explained in greater detail below on the basis of at least one exemplary embodiment with reference to the drawings, in which:

FIG. 3 shows a diagram with a curve course for elucidating the invention, and

FIG. 4 shows a diagram with a curve course for elucidating the invention,

PREFERRED EMBODIMENT OF THE INVENTION

Figure 1:
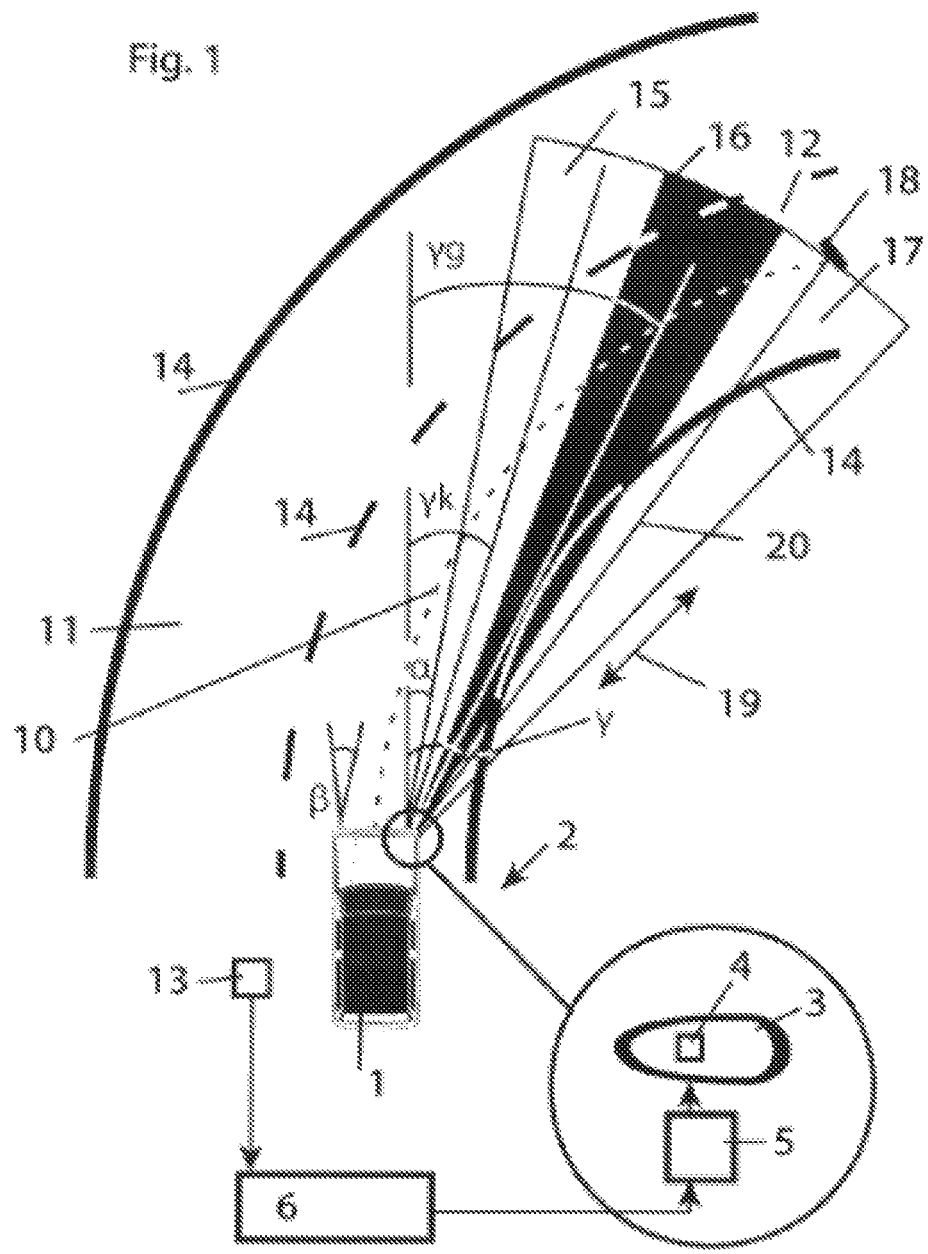
FIG. 1 shows a schematic view of a motor vehicle with a lighting device.

FIG. 1 shows a schematic view of a motor vehicle 1 with a lighting device 2 for controlling a predictive cornering light.

The lighting device 2 has at least one headlight 3 having at least one illuminant 4 to which a pivoting means 5 is assigned in order to pivot the illuminant 4 in the headlight 3 and/or the headlight 3 with the illuminant 4. In this case, pivoting of the illuminant 4 in the headlight 3 and pivoting of the headlight 3 with the illuminant 4 are understood hereinafter synonymously as pivoting of the headlight 3.

A pivoting means 5 is assigned to the headlight 3, which pivoting means is drivable by a control unit 6 in order to be able to pivot the position of the headlight 3 or of the illuminant 4 in the headlight 3, in order to be able to set the angular setting of the light emitted by the headlight 3.

A monitoring device 13 serves for monitoring the roadway 11 and/or the lane 12, said monitoring device being an optical monitoring device, for example. The monitoring device 13 in this case monitors the roadway 11 and/or the lane 12 and preferably ascertains the current travelling trajectory 10 of the vehicle in order to be able to set, e.g. to be able to pivot, the headlight or headlights 3 by means of the respective pivoting means 5 in such a way as to achieve an improved illumination of the roadway 11 and/or the lane 12 in front of the vehicle 1.

In this case, the roadway 11 and/or the lane 12 are/is preferably identified by recognition of road markings by virtue of the fact that the monitoring device 13 detects the road markings 14 in front of the vehicle 1 and the control unit 6 evaluates the course of the road markings 14 in order to determine a course of the roadway 11 and/or of the lane 12 in front of the vehicle 1 in relation to the position of the vehicle 1, in order to determine therefrom the pivoting angle $\alpha$, $\beta$ for the respective headlight 3, and in order to set the respective headlight 3 with regard to the determined pivoting angle $\alpha$, $\beta$ by means of the adjusting means 5.

FIG. 1 illustrates three scenarios 15, 16, 17 for a setting of a headlight 3 in the case of imminent cornering by the motor vehicle.

The setting of the pivoting angle in accordance with scenario 17 constitutes a setting of the pivoting angle for which a first pivoting angle $\gamma$ is determined from the roadway data at a roadway point 18 at a predetermined distance 19 in front of the vehicle. Said first pivoting angle corresponds to the illumination of the roadway up to the roadway point 18. This is sufficient for roadways 11 or lanes 12 having a large curve radius. In the case of a small curve radius, as shown in FIG. 1, however, a considerable portion of the emitted light is guided past the roadway 12 or the lane 12.

Therefore, a second corrected pivoting angle $\gamma_K$ is determined from the first pivoting angle $\gamma$ depending on the ascertained curve radius. Said corrected pivoting angle $\gamma_K$ leads to the illumination scenario 15, in which, although the roadway in front of the vehicle is illuminated better, the roadway point 18 at the predefined distance is not reached. This should be preferred, however, in the case of small curve radii. In this case, a correction of the first pivoting angle $\gamma$ is performed, which leads to a reduction of the pivoting angle to $\gamma_K$. This means that $\gamma_K$ is less than $\gamma$ and a pivoting angle of $\gamma$ should thus be regarded as an upper limit for the pivoting angle to be set, while $\gamma_K$ represents a pivoting angle which should be regarded as an upper limit for the setting. In this case, $\gamma_K$ is the pivoting angle which is determined by the point 18 of intersection of the straight line 20 from the vehicle 1 or from the headlight 3 up to the trajectory 10 of the roadway 11 or lane 12 at the predefined distance 19. In this case, the predefined distance 19 in the present exemplary embodiment is in the region of approximately 65 m, although it can also be larger or smaller, such as, for example, 50 m or 70 m, 80 m, 100 m or up to 200 m.

Figure 2:
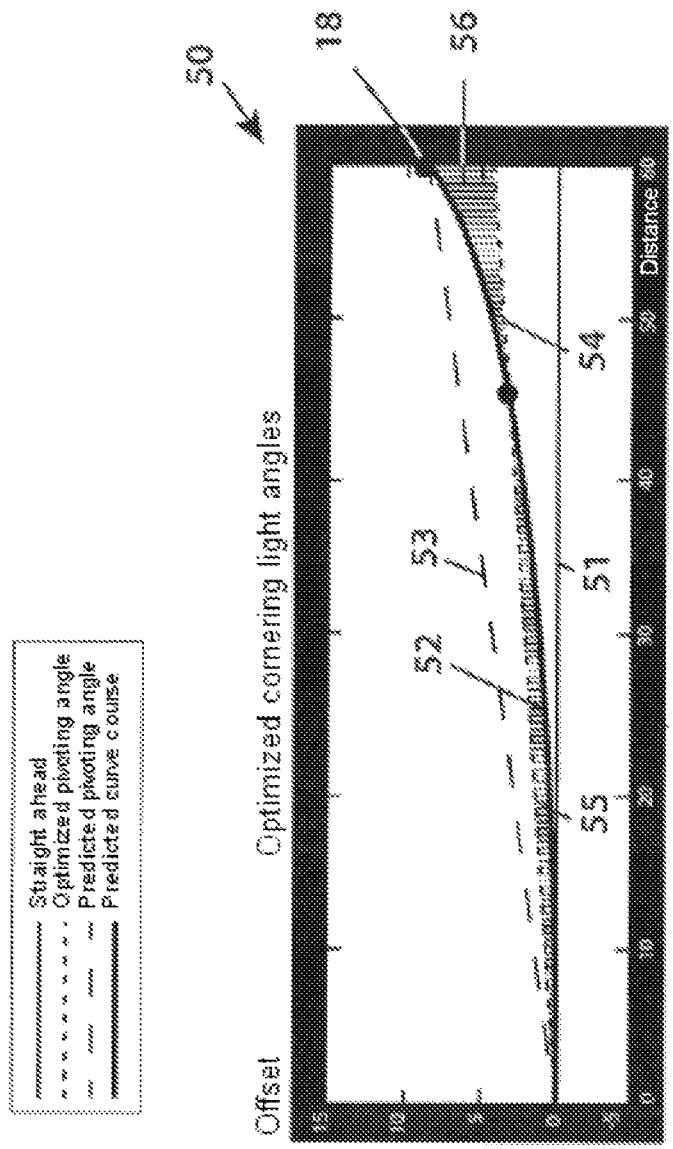
FIG. 2 shows a diagram with a curve course for elucidating the invention.

FIG. 2 elucidates this on the basis of a diagram 50. In this case, the distance to the vehicle 1 is plotted on the x-axis and the offset, that is to say the deviation with respect to the straight line perpendicular to the direction of travel, is taken into consideration on the y-axis.

In this case, the curve 51 represents the straight-ahead curve extending in the direction of travel proceeding from the motor vehicle. The curve 52 represents the ascertained and predicted curve course of the roadway or of the travelling trajectory. The curve 53 represents a straight line with pivoting angle γ, in the case of which the straight line 20 forms the point 18 of intersection at the predefined distance 19 by intersecting the curve course 10.

The straight line 54 represents a straight line in the case of a corrected pivoting angle $\gamma_K$. In this case, the pivoting angle $\gamma_K$ is less than the pivoting angle γ. In this case, the pivoting angle $\gamma_K$ is formed such that the straight line 54 intersects the curve 52 in such a way that the areas 55 and 56 formed between the straight line 54 and the curve 52 attain a predefinable ratio.

In the exemplary embodiment in FIG. 2, the ratio of the size of the areas 55 and 56 is equal to 1, i.e. the area 55 is of the same size as the area 56. The pivoting angle $\gamma_K$ is correspondingly definable.

In a departure therefrom, it is possible to determine a weighted pivoting angle $\gamma_G$ lying between the two pivoting angles γ and $\gamma_G$. In this case, the weighted pivoting angle $\gamma_G$ is determined by a weighting of the curve radius being introduced from the corrected pivoting angle. In this case, the ratio between the areas 55 and 56 is chosen differently depending on the curve radius.

FIG. 3 elucidates this on the basis of a diagram 60. In this case, the distance to the vehicle 1 is plotted on the x-axis and the offset, that is to say the deviation with respect to the straight line perpendicular to the direction of travel, is taken into consideration on the y-axis.

In this case, the curve 61 represents the straight-ahead curve extending in the direction of travel proceeding from the motor vehicle. The curve 62 represents the ascertained and predicted curve course of the roadway or of the travelling trajectory. The curve 63 represents a straight line with pivoting angle γ, in the case of which, in FIG. 1, the straight line 20 forms the point 18 of intersection at the predefined distance 19 by intersecting the curve course 10.

The straight line 64 represents a straight line in the case of a corrected pivoting angle $\gamma_K$. In this case, the pivoting angle $\gamma_K$ is less than the pivoting angle γ. In this case, the pivoting angle $\gamma_K$ is formed such that the straight line 64 intersects the curve 62 in such a way that the areas 65 and 66 formed between the straight line 64 and the curve 62 attain a predefinable ratio of 1:1. Correspondingly, the ratio of the size of the areas 65 and 66 is equal to 1, i.e. the area 65 is of the same size as the area 66. The pivoting angle γK is correspondingly definable.

In a departure therefrom, it is possible to determine a weighted pivoting angle $\gamma_G$ lying between the two pivoting angles γ and $\gamma_G$. The straight line 67 represents a straight line in the case of a weighted pivoting angle $\gamma_G$. In this case, the pivoting angle $\gamma_G$ is less than the pivoting angle γ but greater than the pivoting angle $\gamma_K$. In this case, the pivoting angle $\gamma_G$ is formed such that the straight line 67 intersects the curve 62 in such a way that the areas 68 and formed between the straight line 67 and the curve 62 attain a predefinable ratio which is a function of the curve radius. As can be discerned in FIG. 3, the ratio of the size of the area 68 to the size of the area 69 is greater than 1, such as greater than 2 or greater than 3.

In this case, the weighted pivoting angle $\gamma_G$ is determined by virtue of the fact that it is introduced from the corrected pivoting angle by means of a weighting on the basis of the curve radius. In this case, FIG. 3 elucidates the substantive matter on the basis of an example with a small curve radius.

FIG. 3 elucidates the substantive matter on the basis of an example with a large curve radius on the basis of a diagram 70. In this case, the distance to the vehicle 1 is plotted on the x-axis and the offset, that is to say the deviation with respect to the straight line perpendicular to the direction of travel, is taken into consideration on the y-axis.

In this case, the curve 71 represents the straight-ahead curve extending in the direction of travel proceeding from the motor vehicle. The curve 72 represents the ascertained and predicted curve course of the roadway or of the travelling trajectory. The curve 73 represents a straight line with pivoting angle γ, in the case of which, in FIG. 1, the straight line 20 forms the point 18 of intersection at the predefined distance 19 by intersecting the curve course 10.

The straight line 74 represents a straight line in the case of a corrected pivoting angle $\gamma_K$. In this case, the pivoting angle $\gamma_K$ is less than the pivoting angle γ. In this case, the pivoting angle $\gamma_K$ is formed such that the straight line 74 intersects the curve 72 in such a way that the areas 75 and 76 formed between the straight line 74 and the curve 72 attain a predefinable ratio of 1:1. Correspondingly, the ratio of the size of the areas 75 and 76 is equal to 1, i.e. the area 75 is of the same size as the area 76. The pivoting angle γK is correspondingly definable.

In a departure therefrom, it is possible to determine a weighted pivoting angle $\gamma_G$ lying between the two pivoting angles γ and $\gamma_G$. The straight line 77 represents a straight line in the case of a weighted pivoting angle $\gamma_G$. In this case, the pivoting angle $\gamma_G$ is less than the pivoting angle γ but greater than the pivoting angle $\gamma_K$. In this case, the pivoting angle $\gamma_G$ is formed such that the straight line 77 intersects the curve 72 in such a way that the areas 78 and formed between the straight line 67 and the curve 72 attain a predefinable ratio which is a function of the curve radius. As can be discerned in FIG. 3, the ratio of the size of the area 78 to the size of the area 79 is considerably greater than 1, such as greater than 2 or greater than 3.

In the relationship of the two FIGS. 3 and 4, it is recognized that the points of intersection between the straight lines 64 and respectively 67 and the curve 62 are at smaller distances in relation to the points of intersection between the straight lines 74 and respectively 77 and the curve 72. This means that the respective pivoting angle $\gamma_K$ and $\gamma_G$ is smaller in the case of a large curve radius than in the case of a smaller curve radius.

The method according to the invention with its exemplary embodiments addresses the problem of controlling the illumination of the roadway and advantageously improving or even maximizing it.

This improvement or maximization can be achieved in accordance with the above exemplary embodiment. Moreover, this can be achieved using other methods in accordance with the concept according to the invention. The above-described method of area equality can also be represented in more general form.

In this case, the basic concept involves taking into consideration the headlight light distribution or an imaging of the headlight light distribution on the road and adapting the position thereof depending on the course of the road by rotation by means of the ascertained adjustment of the pivoting angle and determining, depending on the rotation, the actual pivoting angle which should be subsequently be set.

In this case, a virtually perfect headlight light distribution can be used or else, in order to be able to adapt to the current requirements in respect of computation capacity and memory space, an alternative also involves striving not for a perfect representation of the headlight light distribution, but rather only for a headlight light distribution which is sufficiently accurate for the respective application. A model of a headlight light distribution is correspondingly used.

This model of the headlight light distribution is adapted to the course of the road proceeding from an initial model position by rotation about a point in front of the vehicle or in front of the respective headlight. The rotation axis provided is preferably an axis perpendicular to the vehicle plane and/or roadway plane which runs as a vertical axis through the rotation point.

How well an adaptation is present or has to be readjusted can be determined by the measurement of the deviation between the model of the light distribution and the roadway. In this case, the deviation is intended to be as small as possible or minimized. A pivoting angle can then finally be determined on the basis of the resulting position of the model of the light distribution, that is to say the optimum model position. This can be the angle between the initial model position and the final or optimum model position. In this case, it is expedient if the initial model position corresponds to the headlight light distribution without pivoting.

The minimization of the deviation can be effected in various ways. For this purpose, firstly all partial deviations are ascertained. A first minimization approach involves minimizing the sum of all the partial deviations. If A(r) is the deviation dependent on the rotation, than $t_1(r)$ to $t_{12}(r)$ are the partial deviations associated with A(r). In that case, $\min_r = \min A(r) = |\Sigma_{k=i}^{n}|t_k(r)||$.

When taking account of symmetry it is expedient to minimize a difference between a right-hand deviation and a left-hand deviation. If $tr_1$ to $tr_u$ are right-hand partial deviations and $tl_1$ to $tl_v$ are left-hand partial deviations, then the minimum function is defined as $\min_r = \min A(r) = |(\Sigma_{k=i}^{u}|tr_k(r)| - \Sigma_{k=i}^{v}|tl_k(r)|)|$. In this case, it may be expedient for one side to be weighted more than the other side. If $W_r$, $W_l$ are the weighting factors for right and left, than the minimization function is defined as $\min_r = \min A(r) = |(W_r \Sigma_{k=i}^{u}|tr_k(r)| - W_l \Sigma_{k=i}^{v}|tl_k(r)|)|$.

Besides the weighting factors for right and left, it is furthermore possible to weight the partial deviations depending on the distance. In this case, the distance can be ascertained as the distance from the vehicle along the vehicle longitudinal axis or as the distance to a central point in front of the vehicle or the headlight. Preferably, the point then corresponds to the rotation point. Therefore, if $tr_1(r,x)$ to $tr_u(r,x)$ and $tl_1(r,x)$ to $tl_v(x)$ are then partial deviations dependent on the distance x, $w_r(x)$ and $w_l(x)$ are furthermore the distance-dependent weighting function. The minimization function is then defined as $\min_r = \min A(r) = |(W_r \Sigma_{k=i}^{u}|w_r(x) tr_k(r,x)| - W_l \Sigma_{k=i}^{v}|w_l(x) tl_k(r,x)|)|$.

The way in which the partial deviation are ascertained can best be described on the basis of the respective models. In general, it is possible to ascertain partial deviations on the basis of differences. Curve differences, area differences and volume differences can be taken into consideration in this case. Furthermore, there is the possibility of investigating distances at specific locations. One example would involve determining local maximum distances.

The modeling of the headlight light distribution is elucidated below. In a simplest form, this is a section model describing the centroid position of the light distribution. The length of the section is predefinable and can correspond to the low-beam light range, for example.

Figure 5:
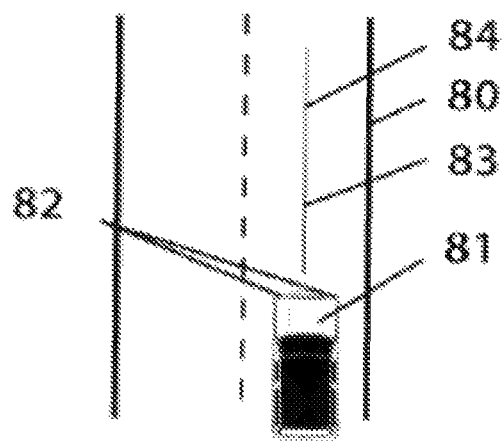
FIG. 5 shows an illustration of a vehicle on a roadway with a section as a model of a headlight light distribution.

FIG. 5 shows such a light distribution. The vehicle is situated on a roadway 80, wherein a headlight light distribution proceeds from the headlights 82. Said headlight light distribution is represented as line 83. The line 83 represents the one-dimensional section as a section model, the lengths of which section corresponds to the length of the actual light distribution, for example on the roadway. However, it is also possible for the length of the section to correspond to the length of the current light distribution. As an initial model position, the section can lie on a straight line in the direction of the vehicle longitudinal axis, as is illustrated in FIG. 5, and that proceeds from the current position of the vehicle. This can either occur from a central position in front of the vehicle, see FIG. 5, or proceed from a central position in front of the headlight 82.

In the case of a section model, the partial deviations can be ascertained particularly well as an area determination between the section 83 representing the light distribution and a curve 84 characterizing the roadway course or the lane course. In the case of a roadway running straight ahead, the section 83 and the curve 84 coincide.

Figure 6:
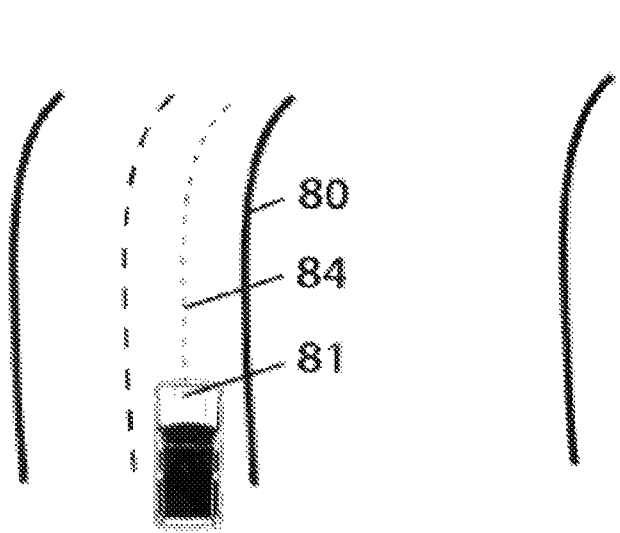
FIG. 6 shows an illustration of a vehicle on a roadway with a curve and with a section as a model of a headlight light distribution.
Figure 7:
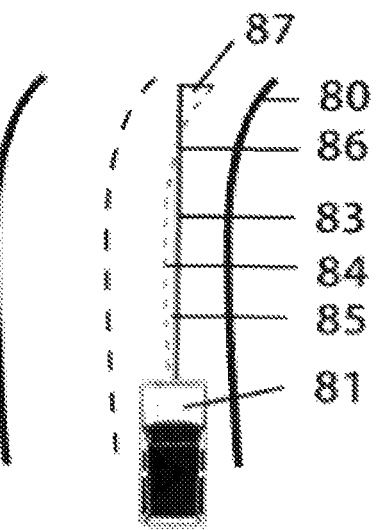
FIG. 7 shows an illustration of a vehicle on a roadway with a curve and with a section as a model of a headlight light distribution.

In the case of a curve course of a roads or roadway the section 83 and the curve 84 characterizing the roadway course or the lane course diverge from one another. A right-hand curve will be considered as an example in FIGS. 6 and 7. In this case, a first area 85 arises as an area between the section 83 and the curve 84 characterizing the roadway course or lane course up to the point 86 of intersection thereof and a second area 87 arises between the section 83 and the curve 84 characterizing the roadway course or lane course after the point 86 of intersection thereof up to a predefinable distance. The latter preferably corresponds to the length of the section 83. The two areas 85 and 87 are the two partial deviations, wherein in the case of a right-hand curve the first area 85 is definable as the right-hand partial deviation and the second area 87 is definable as the left-hand partial deviation. The situation would be correspondingly reversed in the case of a left-hand curve; the first area 85 would be definable as the left-hand partial deviation and the second area 87 would be definable as the right-hand partial deviation.

Since a curve 84 can also be a multiply winding curve, such as an S-curve, the number of areas of the deviation is not restricted to two but rather can also be three or more. Further ascertained areas are subsequently preferably defined iteratively in each case as right-hand or left-hand partial deviation.

The curve can be, in particular, a polygon, a spline or a clothoid. For determining the partial deviations it is also possible to ascertain the area proportion on the left side and on the right side of a travel envelope with respect to the section.

Figure 8:
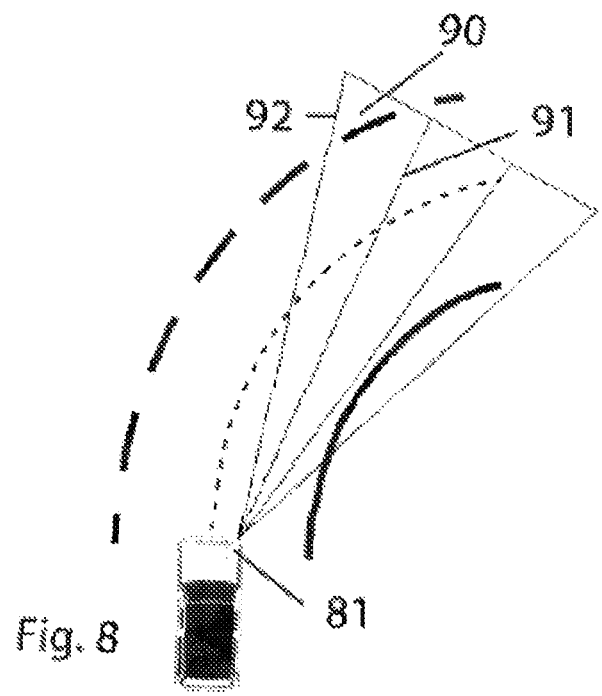
FIG. 8 shows an illustration of a vehicle on a roadway with a section as a model of a headlight light distribution.

A further embodiment variant for a model of a headlight light distribution is an area model. In a simplest form, the area model in this case is defined by the area 90 between a right-hand delimiting ray 91 and a left-hand delimiting ray 92 up to a predefinable distance 93. FIG. 8 shows such an area model, illustrating the area 90 in three different positions. In this case, the respective area 90 is represented as a triangular area proceeding in front of the right headlight. In this way, a separate pivoting angle can be determined for each headlight. However, positioning in a central position in front of the vehicle, that is to say between the two headlights, is also possible.

Figure 9:
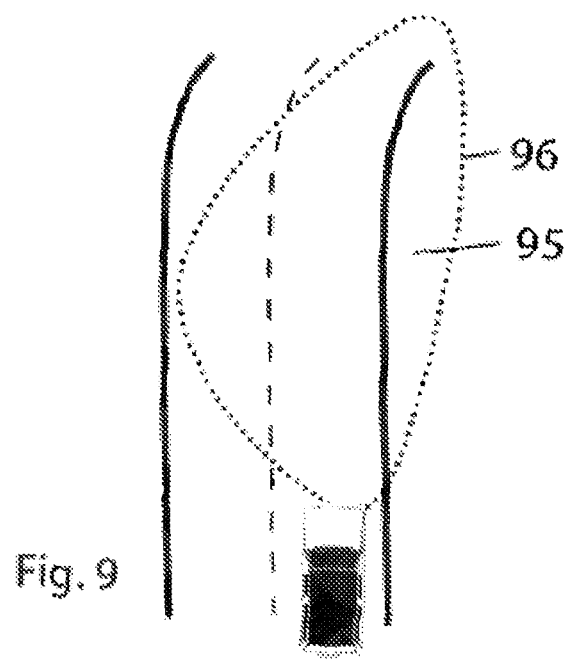
FIG. 9 shows an illustration of a vehicle on a roadway with a section as a model of a headlight light distribution.

More complex areas 95 that better approximate the actual light distribution than the triangular areas 90 shown can also be used as a model. These areas 95 are then advantageously delimited by at least one curve 96. One example of such an area 95 is illustrated in FIG. 9.

The partial deviations can be determined by ascertaining the area on the left and on the right alongside the lane. A further possibility is to determine a deviation from a travelling trajectory. In the case of a non-symmetrical area, it is particularly advantageous here to consider a weighted symmetry for the minimization, such that for example in the vicinity of the vehicle on the left a larger deviation is desired than at a distance. In this case, the weighting function can be chosen depending on the course of the roadway.

In the most general form, the model is a volume model. It is therefore defined three-dimensionally. The advantage here is that a three-dimensional course of the roadway can also be taken into account. For determining the partial deviations it is advantageous here if firstly an intersection area is formed between the volume and the three-dimensional roadway plane. Afterward, the area proportions on the left and on the right alongside the lane on said intersection area can then be determined as partial deviations. Alternatively, the volumes on the left, on the right, above and/or below the lane can be determined as partial deviations.

In this case, the upper partial deviations can be assigned to the right-hand partial deviations and the lower partial deviations can be assigned to the left-hand partial deviations for a symmetrical minimization. Alternatively, it is also possible for only the volume above the lane to be taken into consideration. In the case of a symmetrical minimization, the volume can then be cut into a left-hand partial deviation and a right-hand partial deviation on the basis of a plane through the curve characterizing the roadway course or lane course.

LIST OF REFERENCE SIGNS

1 Motor vehicle
2 Lighting device
3 Headlight
4 Illuminant
5 Pivoting means
6 Control unit
10 Travelling trajectory, curve course
11 Roadway
12 Lane
13 Monitoring device
14 Road marking
15 Scenario
16 Scenario
17 Scenario
18 Roadway point
19 Distance
20 Straight line
50 Diagram
51 Curve
52 Curve
53 Curve
54 Straight line
55 Area
56 Area
60 Diagram
61 Curve
62 Curve
63 Curve
64 Straight line
65 Area
66 Area
67 Straight line
68 Area
69 Area
70 Diagram
71 Curve
72 Curve
73 Curve
74 Straight line
75 Area
76 Area
77 Straight line
78 Area
79 Area
80 Roadway
81 Vehicle
82 Headlight
83 Section
84 Curve
85 Area
86 Point of intersection
87 Area
90 Area
91 Ray
92 Ray
95 Area
96 Curve

The invention claimed is:

1. A method for controlling a predictive cornering light, the method comprising:
providing a vehicle having at least one headlight comprising a pivoting element, an optical monitoring device that monitors a roadway or lane in front of the vehicle and generates roadway data, and a control unit,
generating a model of a headlight light distribution using the roadway data,
determining a pivoting angle by rotating the model of the headlight distribution to minimize a deviation between the model of the headlight light distribution and the roadway, actuating the pivoting element to set a headlight direction for illuminating the roadway or lane to match the pivoting angle,
wherein minimizing the deviation between the model of the headlight light distribution and the roadway corresponds to minimizing a difference of at least one right-hand partial deviation between the roadway and the model and of at least one left-hand partial deviation between the roadway and the model of the headlight light distribution,
wherein the model of the headlight light distribution is a section model,
wherein each partial deviation between the model of the headlight light distribution and the roadway is determined by calculating at least one area between an illumination boundary in a section of the section model and a portion of a curve characterizing a roadway course or lane course corresponding to the section.

2. The method according to claim 1, wherein the pivoting angle corresponds to a resulting rotation angle of the model of the headlight light distribution relative to a selected or initial model position.

3. The method according to claim 2, wherein the selected or initial model position is defined as a position of the model of the headlight light distribution without pivoting.

4. The method according to claim 1, wherein minimizing the deviation between the model of the headlight light distribution and the roadway corresponds to minimizing a sum of a plurality of partial deviations of the roadway from the model of the headlight light distribution.

5. The method according to claim 1, wherein a first area is an area between the section of the section model and a curve characterizing a roadway course or lane course up to a point of intersection thereof and a second area arises between the section and the curve characterizing the roadway course or lane course after the point of intersection thereof up to a predefinable distance, wherein in the case of a right-hand curve the first area is defined as a right-hand partial deviation and the second area is defined as a left-hand partial deviation, and in the case of a left-hand curve the first area is defined as the left-hand partial deviation and the second area is defined as the right-hand partial deviation.

6. The method according to claim 1, wherein a section of the section model lies in a selected or initial model position on a straight line in a direction of the vehicle longitudinal axis and extends forward from a current position of the vehicle.

7. The method according to claim 1, wherein the section model describes a centroid position of the light distribution.

8. The method according to claim 1, wherein the section model is a section of a length of a low-beam light range.

9. The method according to claim 1, wherein the model of the headlight light distribution is an area model.

10. The method according to claim 9, wherein the area model is an area s situated on a roadway plane and delimited by at least one curve.

11. The method according to claim 10, wherein the area model is the area between a right-hand delimiting ray and between a left-hand delimiting ray up to a predefinable distance.

12. A lighting device comprising:
at least one headlight with a pivoting element for controlled pivoting of the headlight for controlling a predictive cornering light in a vehicle,
an optical monitoring device that monitors a roadway or lane in front of the vehicle and generates roadway data,
a control unit that, uses the data of the optical monitoring device to drive the pivoting element for setting the headlight for illuminating the roadway or lane, wherein the control unit is configured to carry out the method according to claim 1.

13. A method for controlling a predictive cornering light, the method comprising:
providing a vehicle having at least one headlight comprising a pivoting element, an optical monitoring device that monitors a roadway or lane in front of the vehicle and generates roadway data, and a control unit,
generating an auxiliary line using the roadway data,
performing an area determination using the profile of the roadway data and an auxiliary line proceeding from the front of the vehicle,
determining a point of intersection between the course of the roadway and the auxiliary line and using the point of intersection to characterize a pivoting angle,
driving the headlight using the pivoting angle,
wherein the area determination is effected in such a way that a predefinable ratio is achieved between a first area between the auxiliary line and the roadway course up to the point of intersection thereof and a second area between the auxiliary line and a roadway course after the point of intersection up to a predefinable distance.

14. The method according to claim 13, wherein the pivoting angle is defined as an angle between the auxiliary line and a vehicle longitudinal direction.

15. The method according to claim 13, wherein the area determination is effected in such a way that a ratio between the first area and the second area assumes a predefinable value.

16. The method according to claim 15, wherein the area determination is effected in such a way that the ratio between the first area and the second area is 1:1.

17. A method for controlling a predictive cornering light, the method comprising:
providing a vehicle having at least one headlight comprising a pivoting element, an optical monitoring device that monitors a roadway or lane in front of the vehicle and generates roadway data, and a control unit,
generating a model of a headlight light distribution using the roadway data,
determining a pivoting angle by rotating the model of the headlight distribution to minimize a deviation between the model of the headlight light distribution and the roadway, actuating the pivoting element to set a headlight direction for illuminating the roadway or lane to match the pivoting angle,
wherein minimizing the deviation between the model of the headlight light distribution and the roadway corresponds to minimizing a sum of a plurality of partial deviations of the roadway from the model of the headlight light distribution,
wherein the model of the headlight light distribution is a volume model,
wherein determining each of the partial deviations is carried out by determining an intersection area between a roadway plane and a volume and by determining an at least one area proportion which lies on the left or on the right alongside the lane on the intersection area.

18. A method for controlling a predictive cornering light, the method comprising:
providing a vehicle having at least one headlight comprising a pivoting element, an optical monitoring device that monitors a roadway or lane in front of the vehicle and generates roadway data, and a control unit,
determining a first pivoting angle from the roadway data at a roadway point at a predetermined distance in front of the vehicle,
determining a second pivoting angle from the first pivoting angle which depends in part on a curve radius of the roadway, actuating the pivoting element to set a headlight direction for illuminating the roadway or lane to match the second pivoting angle,
wherein the first pivoting angle is determined by rotating a model of the headlight distribution to minimize a deviation between the model of the headlight light distribution and the roadway,
wherein the second pivoting angle is determined in such a way that a straight line is determined, whose point of intersection with the ascertained roadway course having a curve radius or lane course having a curve radius is chosen such that the resulting two areas between the straight line and the roadway course having a curve radius or the lane course having a curve radius up to the predetermined distance assume a predefinable size ratio.

19. The method according to claim 18, wherein the second pivoting angle is corrected, relative to the first pivoting angle by using a correction.

20. The method according to claim 19, wherein the correction is greater in the case of a smaller curve radius than in the case of a larger curve radius.

21. A lighting device comprising:
at least one headlight with a pivoting element for controlled pivoting of the headlight for controlling a predictive cornering light in a vehicle, an optical monitoring device that monitors a roadway or lane in front of the vehicle and generates roadway data, a control unit that, uses the data of the optical monitoring device to drive the pivoting element for setting the headlight for illuminating the roadway or lane, wherein the control unit is configured to carry out the method according to claim 18.

22. The method according to claim 18, wherein the first pivoting angle is determinable by ascertaining, using an ascertained roadway course or a lane course, the point of intersection between the roadway course or the lane course and a straight line at the predetermined distance, wherein said straight lane projects forward from the current position of the vehicle.

23. The method according to claim 18, wherein the areas are of identical size.

24. The method according to claim 18, wherein the size ratio is dependent on the curve radius.

25. The method according to claim 24, wherein a first area arranged nearer to the vehicle and a second area further away from the vehicle are formed, wherein a ratio between the sizes of the two areas is chosen depending on the curve radius.

26. The method according to claim 25,
wherein when the curve radius corresponds to a first predefinable curve radius defined as an infinite curve radius, the size of the first area is maximal and the size of the second area is zero,
wherein when the curve radius corresponds a second predefined curve radius, the size of the first area is equal to the size of the second area.

27. The method according to claim 26, wherein when the curve radius corresponds to a radius between the second predefined curve radius and a first predefinable curve radius, the ratio of the size of the first area to the size of the second area is greater than 1:1.

* * * * *